(12) United States Patent
Haag et al.

(10) Patent No.: US 10,852,101 B2
(45) Date of Patent: Dec. 1, 2020

(54) COMMUNICATION SYSTEM FOR TRANSMITTING CAPTURED OBJECT INFORMATION BETWEEN AT LEAST TWO COMMUNICATION PARTNERS

(71) Applicant: STEINER-OPTIK GMBH, Bayreuth (DE)

(72) Inventors: Peter Haag, Bayreuth (DE); Matthias Hofmann, Bayreuth (DE)

(73) Assignee: STEINER-OPTIK GMBH, Bayreuth (DE)

( * ) Notice: Subject to any disclaimer, the term of this patent is extended or adjusted under 35 U.S.C. 154(b) by 0 days.

(21) Appl. No.: 16/461,333

(22) PCT Filed: Jan. 18, 2018

(86) PCT No.: PCT/EP2018/051236
§ 371 (c)(1),
(2) Date: May 15, 2019

(87) PCT Pub. No.: WO2018/134318
PCT Pub. Date: Jul. 26, 2018

(65) Prior Publication Data
US 2019/0285383 A1    Sep. 19, 2019

(30) Foreign Application Priority Data

Jan. 20, 2017 (DE) .......................... 10 2017 101 118

(51) Int. Cl.
*F41G 3/16* (2006.01)
*F41G 3/02* (2006.01)
(Continued)

(52) U.S. Cl.
CPC .............. *F41G 3/165* (2013.01); *F41G 3/02* (2013.01); *F41G 3/06* (2013.01); *F41G 3/065* (2013.01);
(Continued)

(58) Field of Classification Search
CPC ... F41G 3/165; F41G 3/02; F41G 3/06; F41G 3/065; G06F 3/14; H04N 7/181; H04W 84/12
(Continued)

(56) References Cited

U.S. PATENT DOCUMENTS 5,822,713 A * 10/1998 Profeta ..................... F41G 3/02
701/302
6,499,382 B1    12/2002 Lougheed et al.
(Continued)

FOREIGN PATENT DOCUMENTS

DE    102011105303 A1    12/2012
DE    102013012257 A1    1/2015
(Continued)

*Primary Examiner* — Samir Abdosh
(74) *Attorney, Agent, or Firm* — Rimôn, P.C.

(57) ABSTRACT

A communication system for transmitting detected object information items (OI) between two communication partners, comprising: a first communication partner, formed as a target distance measuring device having a communication device and an object detection device, wherein the object detection device detects remote objects and generates an OI describing a respective detected remote object, and the communication device transmits a generated OI to a second communication partner, a second communication partner, formed as a telescopic sight device having a communication device and a display device displaying a visual field which varies depending on the orientation of the telescopic sight device, wherein the communication device is configured to receive OI transmitted by the first communication partner and the display device is configured to display received OI, wherein objects located outside the visual field at a given orientation of the telescopic sight device are displayable marked as outside the visual field.

13 Claims, 3 Drawing Sheets

Figure 1:
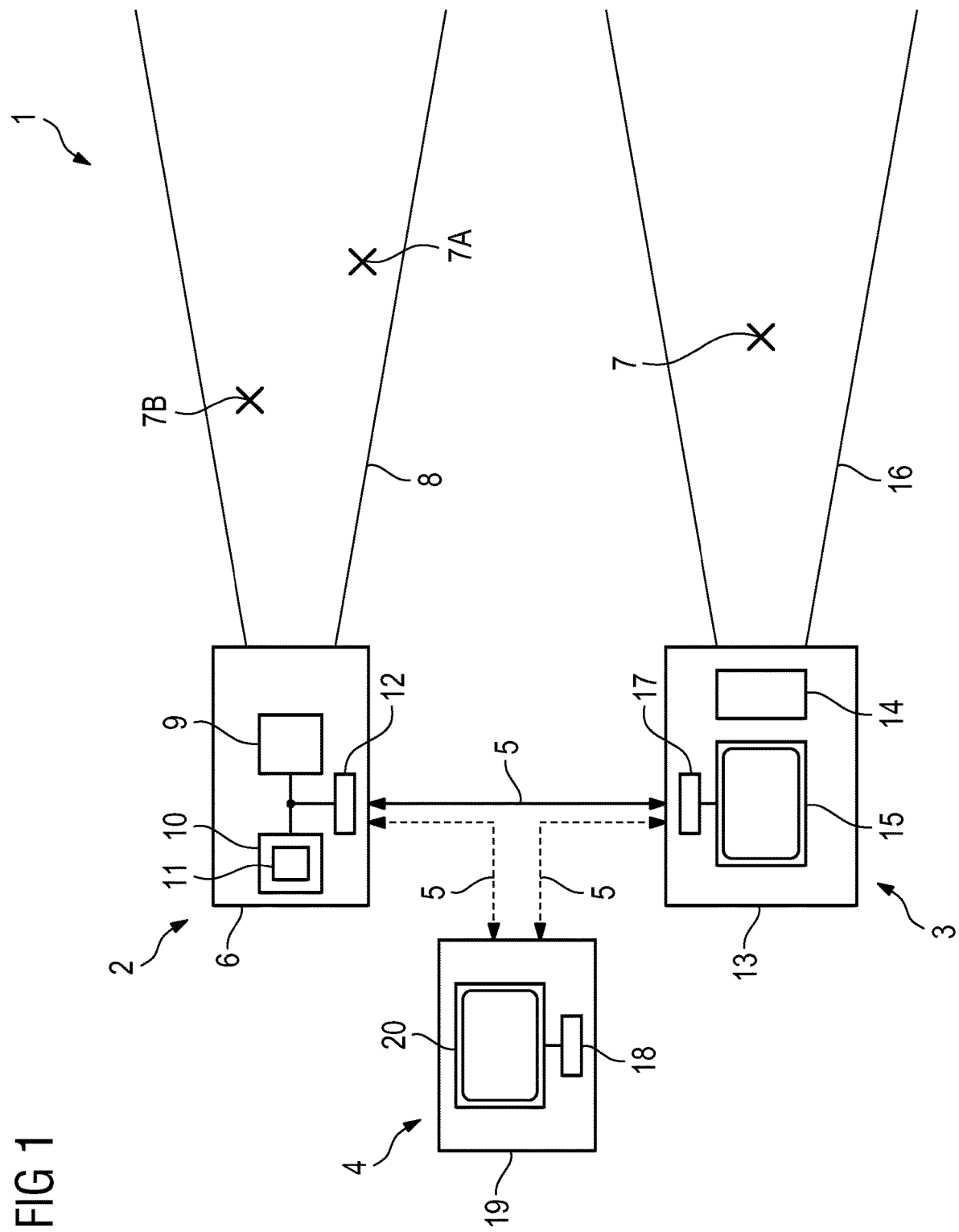

(51) Int. Cl.
    *F41G 3/06*           (2006.01)
    *G06F 3/14*           (2006.01)
    *H04N 7/18*           (2006.01)
    *H04W 4/80*          (2018.01)
    *H04W 84/12*         (2009.01)

(52) U.S. Cl.
    CPC ............... *G06F 3/14* (2013.01); *H04N 7/181* (2013.01); *H04W 4/80* (2018.02); *H04W 84/12* (2013.01)

(58) Field of Classification Search
    USPC .......................................................... 42/119
    See application file for complete search history.

(56) References Cited

U.S. PATENT DOCUMENTS

| | | |
|---|---|---|
| 8,939,366 B1 | 1/2015 | Kelly |
| 9,291,424 B2 * | 3/2016 | Tagarro ...................... F41J 5/10 |
| 10,267,598 B2 * | 4/2019 | Fougnies ................ G01S 19/13 |
| 2009/0195652 A1 * | 8/2009 | Gal ........................... F41G 3/06 348/148 |
| 2014/0075821 A1 * | 3/2014 | Li ............................. F41G 3/06 42/130 |
| 2014/0188385 A1 * | 7/2014 | McHale .................. F41G 1/473 701/523 |
| 2015/0253106 A1 * | 9/2015 | Lupher ................... F41A 17/08 42/111 |
| 2018/0347949 A1 * | 12/2018 | Lupher ................... G01S 7/487 |

FOREIGN PATENT DOCUMENTS

| | | |
|---|---|---|
| EP | 3287736 A1 | 2/2018 |
| WO | 2012131548 A1 | 10/2012 |
| WO | 2016187713 A1 | 12/2016 |

* cited by examiner

COMMUNICATION SYSTEM FOR TRANSMITTING CAPTURED OBJECT INFORMATION BETWEEN AT LEAST TWO COMMUNICATION PARTNERS

CROSS-REFERENCE TO RELATED APPLICATIONS

This application is a United States national stage entry of an International Application serial no. PCT/EP2018/051236 filed Jan. 18, 2018, which claims priority to German Patent Application serial no. 10 2017 101 118.8 filed Jan. 20, 2017. The contents of these applications are incorporated herein by reference in their entirety as if set forth verbatim.

The invention relates to a communication system for transmitting detected object information items between at least two communication partners.

A corresponding communication system comprises at least two communication partners communicating with each other as communicating components of the communication system. A respective communication partner forming a component of the communication system comprises a communication device which is configured to transmit information to a further communication partner and/or to receive information transmitted by a further communication partner.

In the communication system described herein which, for example, can be provided for military use, a first communication partner is a target distance measuring device and a second communication partner is a telescopic sight device. The target distance measuring device comprises, in addition to the communication device, an object detection device which is configured to detect remote objects and to generate an object information item describing a respective detected object. The telescopic sight device comprises, in addition to the communication device, a display device comprising a visual field which varies depending on the (spatial) alignment of the telescopic sight device.

To date, it is common practice for a given orientation of the telescopic sight device to actually display on the display device only objects located in the visual field at the given orientation of the telescopic sight device. Objects located outside the visual field of the telescopic sight device at the given orientation of the telescopic sight device are not displayed. The information content of the display device is therefore limited to the objects actually located in the visual field of the telescopic sight device.

The object underlying the invention is to disclose an improved communication system, in particular with regard to an extended information content of a display device of a telescopic sight device forming a communication partner of a communication system.

The object is achieved by a communication system according to claim 1. The dependent claims relate to possible embodiments of the communication system.

The communication system described herein, which can also be referred to as or considered a communication device, generally serves to transmit detected object information items—which can also be referred to as or considered object data—between a plurality of, that is, at least two, communication partners. As is given in the following, the transmission of detected object information items and the transmission of all further information between the respective communication partners of the communication system typically takes place via a radio-based, in particular bidirectional, possibly data-encrypted, communication connection between the respective communication partners of the communication system. A radio-based communication connection can be based on any communication standard for radio-based data transmission, so that reference is made to Bluetooth or WLAN connections only by way of example.

A first communication partner of the communication system is a target distance measuring device. The target distance measuring device is configured in its basic functionality for detecting a distance between the location of the target distance measuring device and an object or target remote therefrom. The detection of the distance between the location of the target distance measuring device and an object remote from this can, for example, be effected optically. Specifically, the target distance measuring device can for example be formed as a so-called range finder, in particular laser range finder, or comprise such. The target distance measuring device can be associated with a first user of the communication system.

The target distance measuring device is formed with an object detection device or comprises at least one such. The object detection device implemented as hardware and/or software is configured to detect remote objects which are both living mobile or stationary objects, that is, humans or animals, and inanimate mobile or stationary objects, that is, for example, land or air crafts, buildings, etc., and to generate at least one object information item directly or indirectly describing or relating to a respective detected object. The object information item can, for example, describe or relate to the orientation and/or position of an object, in particular also the relative orientation and/or position of the object relative to the target distance measuring device. To detect respective remote objects, the object detection device can be equipped with suitable object detection algorithms, which are configured to detect specific objects, possibly from a plurality of detected objects, in particular based on specific detectable object-specific features.

The target distance measuring device is further formed having a communication device or comprises at least one such. The communication device can be configured for, in particular radio-based, possibly encrypted, transmission of information to and/or from a further communication partner of the communication system. Specifically, the communication device can be a, possible modular, transmitting and/or receiving device. The communication device is in particular configured to transmit an object information item generated by the object detection device to a second communication partner of the communication system, that is, in particular to a telescopic sight device explained below.

A second communication partner of the communication system is a telescopic sight device, optionally fastenable or fastened to a firearm device such as a rifle. According to its basic functionality, the telescopic sight device is configured to optically magnify or enlarge a scene distant from the location of the telescopic sight device or an object or target located within such a scene, and comprises suitable optically magnifying elements, that is, in particular an optically magnifying arrangement, in particular of lens-like or lens-shaped optical elements. The optically magnifying or enlarged display of the scene remote from the location of the telescopic sight device can be done, for example, electronically and/or optically. Specifically, the telescopic sight device can for example be formed as an optical and/or electronic telescopic sight or comprise such. The telescopic sight device can be assigned a second user of the communication system, which can for example be a sharp shooter.

The telescopic sight device is formed having a display device or comprises at least one such device. The display device or the telescopic sight device comprises a visual field which varies depending on the (spatial) orientation of the telescopic sight device. The visual field changes accordingly in a manner known per se depending on the (spatial) orientation of the telescopic sight device. The display device can be arranged or formed in an optical channel of the telescopic sight device extending between an eyepiece-side and an objective-side end. The display device can, for example, be formed as an electronic display, in particular as an OLED display, or comprise such.

The telescopic sight device is also formed having a communication device or comprises at least one such device. The communication device can be configured for, in particular radio-based, possibly encrypted, transmission of information to and/or from a further communication partner of the communication system. Specifically, the communication device can be an optionally modular, transmitting and/or receiving device. The communication device is in particular configured to receive an object information item transmitted by the first communication partner, that is, the telescopic sight device.

The display device is configured to display generated display contents, in addition to the display contents supplied by the telescopic sight device, that is, in particular the scene optically magnified by means of the telescopic sight device, even display contents not supplied by the telescopic sight device, that is, in particular independently of the display contents supplied by the telescopic sight device. The latter display contents are, in particular, received object information items. The display device is thus configured to also display received object information items in addition to the display contents supplied by the telescopic sight device. It is essential that, at a given orientation of the telescopic sight device and a visual field of the telescopic sight device defined by the given orientation of the telescopic sight device, objects located outside of the visual field are marked as displayable or displayed outside the visual field of the telescopic sight device. By means of the display device, therefore, objects possibly supplied by the telescopic sight device, actually located in the visual field of the telescopic sight device at a given orientation of the telescopic sight device, and objects additionally located outside the visual field of the telescopic sight device at the given orientation of the telescopic sight device, can be displayed. Objects located outside the visual field of the telescopic sight device at the given orientation of the telescopic sight device are displayed marked as located outside the visual field of the telescopic sight device.

On the one hand, the display contents supplied via the telescopic sight device are therefore displayed to the user of the telescopic sight device via the display device of the telescopic sight device. On the other hand, received object information items can be displayed to a user of the telescopic sight device, wherein if these include objects located outside the visual field of the telescopic sight device at a given orientation of the display device or the telescopic sight device, are displayed marked as located outside the visual field of the telescopic sight device. A user of the telescopic sight device is informed via the display device on the one hand about objects actually located in the visual field of the telescopic sight device and about objects located outside the visual field of the telescopic sight device or the scene. The information content of the display device is therefore not limited to the objects actually located in the visual field. There is an improved communication system, in particular with regard to an extended information content of the display device of the telescopic sight device.

An object described by the object information item, in particular located outside the visual field of the telescopic sight device at a given orientation of the telescopic sight device, does not have to be displayed as this very object, that is, an object with the actually given, especially visual, features of the object. An object described by the object information item can therefore be partially or completely displayed in another representation, that is, in particular partially or completely abstracted. In particular, an object described by the object information item, in particular located outside the visual field of the telescopic sight device at a given orientation of the telescopic sight device, can be represented by graphical and/or alphanumeric information items. A correspondingly changed or abstracted representation of objects described by the object information item can, for example, with regard to the data volume transmitted between the communication partners, be expedient, as the transmitted data volume can be kept relatively small.

Objects located outside the visual field at the or a given orientation of the telescopic sight device can therefore be displayable or displayed marked outside the visual field by a graphical information item, in particular by at least one symbol. A corresponding graphical information item, that is, in particular a corresponding symbol, can be at least one graphical element, in particular a point, a triangle, a quadrangle, etc., or a combination of several, possibly different, graphical elements.

Alternatively or in addition, objects located outside the visual field at the or a given orientation of the telescopic sight device can be displayable or displayed marked as outside the visual field by an alphanumeric information item. A corresponding alphanumeric information item can be at least one alphanumeric element, in particular a letter or a number, or a combination of several, possibly different, alphanumeric elements.

As noted, objects located outside of the visual field at the or a given orientation of the telescopic sight device can be displayable or displayed marked as outside the visual field by a graphical information item and/or by an alphanumeric information item. In this case, objects which differ in at least one object parameter relating to a property of the respective object is displayable or displayed by different graphical information items and/or by different alphanumeric information items. For example, the distance of the respective objects to the telescopic sight device can be used as a respective object parameter. Consequently, objects located at different distances from the telescopic sight device can be represented differently, that is, in particular in different colors and/or geometries.

In order to ensure a clear optical distinctness of respective objects located within and outside the visual field at the or a given orientation of the telescopic sight device, objects located within the visual field can be displayable or displayed by a first graphical and/or alphanumeric information item at the or a given orientation of the telescopic sight device marked as within the visual field and objects located outside the visual field at the or a given orientation of the telescopic sight device can be displayable or displayed by a second graphical and/or alphanumeric information item different from the first graphical and/or alphanumeric information item marked as outside the visual field.

A first graphical information item and a second graphical information item, in particular a first and a second symbol, can differ, for example, in at least one symbol parameter, describing in particular the geometry and/or the color of a respective symbol. Similar applies to first and second alphanumeric information items.

As noted, objects located outside of the visual field at the or a given orientation of the telescopic sight device are displayable or displayed as outside the visual field by a graphical information item in the form of a symbol. In this case, the symbol can be a directional symbol, in particular arrow-like or -shaped, which indicates a direction in which the respective object is located relative to the telescopic sight device. The information content of the representation of respective objects that are marked displayable or displayed outside of the visual field is thereby increased in a simple manner and the communication system as a whole is further improved.

Objects located outside the visual field at the or a given orientation of the telescopic sight device are displayable or displayed in addition to at least one additional alphanumeric information item. As will be seen below, the information content can thus further be increased in connection with the display of objects located outside the visual field and the communication system can be further improved overall.

The alphanumeric information item or the additional alphanumeric information item can be, for example, a distance information item describing a distance of the respective object relative to the telescopic sight device, and/or a position information item describing a current or future position, in particular GPS coordinate position, of the respective object, and/or a relative distance information item describing a current or future relative position of the respective object relative to the telescopic sight device, and/or subject information item describing the type and/or subject of the object, and/or object evaluation information item evaluating the object as friendly, hostile or neutral or unknown. Corresponding additional information items, that is, for example, current or future positions, in particular GPS coordinate positions, position information items describing a respective object, can be generated by a further communication partner of the communication system and explained further below, and transmitted to the target distance measuring device and/or the telescopic sight device.

The object detection device can comprise a hardware and/or software-implemented selection device, which is configured for the user-side selection of certain detected remote objects from a number of remote objects detected by means of the object detection device. The selection device is a user interface, that is, for example, a user actuating element arranged or formed on a housing of the target distance measuring device, via which a user can make a selection of certain detected remote objects from a number of remote objects detected by means of the object detection device. The object detection device can be configured to generate an object information item describing at least one user-selected detected remote object. The selection device thus enables a selection of specific objects detected by means of the object detection device, so that this descriptive object information item is generated and transmitted to the telescopic sight device only for user-selected detected remote objects. This, in turn, can be expedient with regard to the data volume transmitted between the communication partners, as the transmitted data volume can be kept comparatively small.

In addition to the first or second communication partner(s), the communication system can additionally comprise at least one further communication partner. The further communication partner is of course formed having a communication device or comprises at least one such. The communication device can be configured for, in particular radio-based, possibly encrypted, transmission of information to and/or from the first and/or second communication partner of the communication system. Specifically, the communication device can be an optionally modular-type, transmitting and/or receiving device.

The at least one further communication partner can be formed having a communication device, for example, as a user-side mobile end device, in particular as a laptop, smartphone or tablet PC. The communication device of the further communication partner can be configured to receive object information items transmitted by the first communication partner. The further communication partner can be configured to process the object information item transmitted by the first communication partner in terms of hardware and/or software, that is, in particular with regard to an evaluation criterion, such as to evaluate a temporal change of the object information item, for example, at a time-varying position of the object described by the object information item.

As indicated above, the at least one further communication partner can be configured to generate corresponding additional information, position information describing a respective object, that is, for example, current or future positions, in particular GPS coordinate positions, can be generated by a, further explained below, further communication partner of the communication system and to transmit them to the target distance measuring device and/or the telescopic sight device.

The further communication partner can comprise a display device for displaying information and a storage device in which geographical map information is stored. The display device can, for example, be configured to display geographical map information and additional object located therein and described by a received object information item and/or a line of vision described by a received visual field information item and/or a visual field described by a received visual field information item.

The invention also relates to a target distance measuring device for a communication system as described. The target distance measuring device is characterized in particular by a communication device and an object detection device, wherein the object detection device is configured to detect remote objects and to generate an object information item describing or relating to a respective detected remote object, and the communication device is configured to transmit a generated object information item to a second communication partner. All statements relating to the communication system, in particular the target distance measuring device, apply analogously to the target distance measuring device.

The invention further relates to a telescopic sight device for a communication system as described. The telescopic sight device is characterized by a communication device and a display device comprising a visual field which varies depending on the alignment of the telescopic sight device, wherein the communication device is configured to receive object information items transmitted by a communication partner, and the display device is configured to display received object information items, wherein objects located outside of the visual field at a given orientation of the telescopic sight device are displayable or displayed marked as outside of the visual field. All statements relating to the communication system, in particular the telescopic sight device, apply analogously to the telescopic sight device.

Finally, the invention relates to a method for transmitting detected object information items between at least two communication partners. The method is characterized in that a communication system as described is used for its implementation. All embodiments of the communication system apply analogously to the method.

Figure 2:
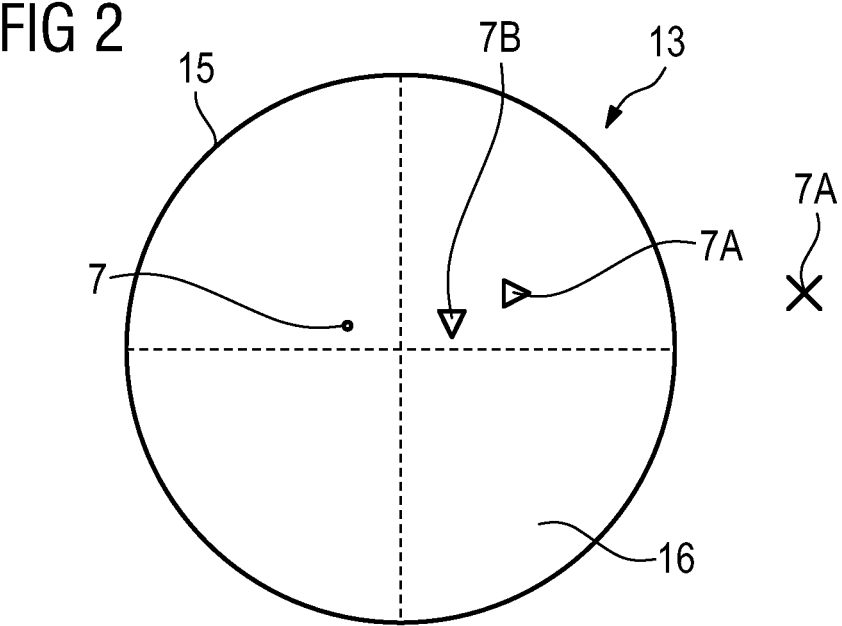
Figure 3:
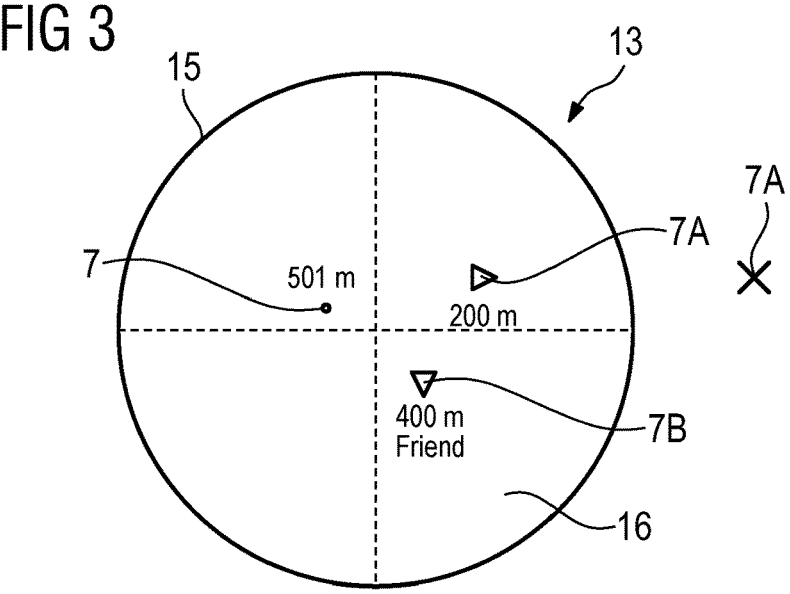
Figure 4:
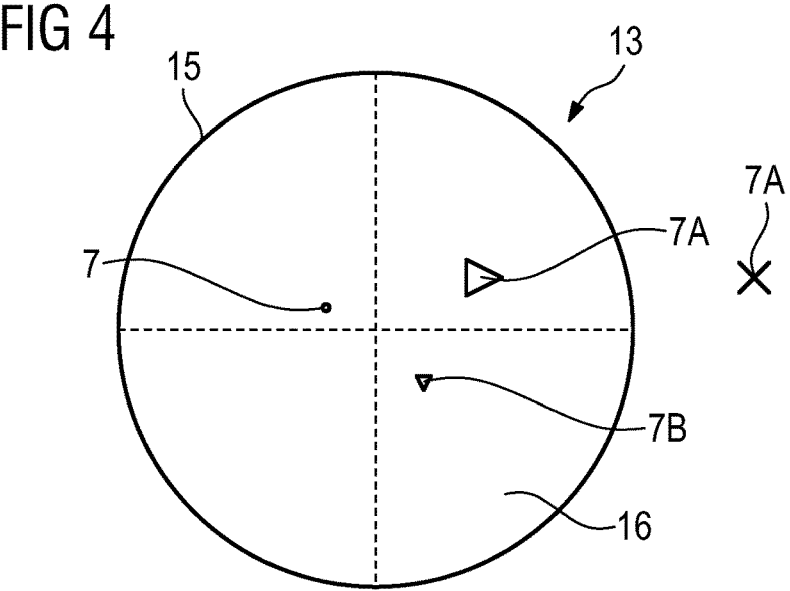

The invention is explained in more detail with reference to exemplary embodiments in the drawing figures. Shown are in:

FIG. 1 a schematic diagram of a communication system according to one embodiment;

FIGS. 2-4 each a display of a display device of a telescopic sight device according to one embodiment.

FIG. 1 shows a schematic diagram of a communication system 1 according to an embodiment.

The communication system 1 serves to transmit detected object information items between a plurality, that is, at least two, communication partners 2-4. The transmission of detected object information items, and all further information items, takes place between the respective communication partners 2-4 of the communication system 1 via a radio-based, in particular bidirectional, possibly data-encrypted, communication connection (see arrow 5) between the respective communication partners 2-4 of the communication system 1. A radio-based communication connection can be based on any communication standard for radio-based data transmission, so that reference is made to Bluetooth or WLAN connections only by way of example.

The first communication partner 2 of the communication system 1 is a target distance measuring device 6. The target distance measuring device 6 is configured to detect a distance between the location of the target distance measuring device 6 and an object 7 or target remote therefrom, and for this purpose comprises a specific detection region 8. In the embodiment shown, the target distance measuring device 6 is formed as a so-called range finder, in particular laser range finder. The target distance measuring device 6 is typically associated with a first user (not shown) of the communication system 1.

The target distance measuring device 6 is formed with an object detection device 9. The object detection device 9 implemented as hardware and/or software is configured to detect remote objects 7 which are both living mobile or stationary objects, that is, humans or animals, and inanimate mobile or stationary objects, that is, for example, land or air vehicles, buildings, etc., and to generate at least one object information item OI directly or indirectly describing or relating to a respective detected object. The object information item OI can, for example, describe or relate to the orientation and/or position of an object 7, in particular also the relative orientation and/or position of the object 7 relative to the target distance measuring device 6. To detect respective remote objects 7, the object detection device 9 can be equipped with suitable object detection algorithms, which, in particular based on specific detectable object-specific features, are configured to detect specific objects 7, possibly from a plurality of detected objects 7.

The object detection device 9 optionally comprises a hardware and/or software implemented selection device 10, which is configured for the user-side selection of certain detected remote objects 7 from a number of remote objects 7 detected by means of the object detection device 9. The selection device 10 is a user interface 11, that is, for example, a user actuating element arranged or formed on a housing (not designated) of the target distance measuring device 6, via which a user can make a selection of certain detected remote objects 7 from a number of remote objects 7 detected by means of the object detection device 9. The object detection device 9 can be configured to generate at least one object information item OI describing a user-side-selected detected remote object 7.

The target distance measuring device 6 is further formed having a communication device 12. The communication device 12 is configured for radio-based, possibly encrypted, transmission of information to and/or from a further communication partner 3, 4 of the communication system 1. Specifically, the communication device 12 can be an optionally modular, transmitting and/or receiving device. The communication device 12 is configured to transmit an object information item OI generated by the object detection device 9 to further communication partners 3, 4 of the communication system 1.

A second communication partner 3 of the communication system 1 is a telescopic sight device 13, optionally fastenable or fastened to a firearm device (not shown) such as a rifle. The telescopic sight device 13 is configured for optically enlarging or magnifying a scene remote from the location of the telescopic sight device 13 or an object 7 or target located within such a scene, and comprises suitable optically magnifying elements, that is, in particular, an optically magnifying arrangement 14, for this purpose, in particular lens-like or -shaped, optical elements (not shown). The optically magnified or enlarged display of the scene remote from the location of the telescopic sight device 13 can be done, for example, electronically and/or optically. In the exemplary embodiment shown, the telescopic sight device 13 is formed as an optical and/or electronic telescopic sight device. The telescopic sight device 13 can be associated with a second user (not shown) of the communication system 1 in which can be, for example, a sharp shooter.

The telescopic sight device 13 is formed having a display device 15. The display device 15 or the telescopic sight device 13 comprises a visual field 16 that varies depending on the (spatial) orientation of the telescopic sight device 13. The visual field 16 changes accordingly in a manner known per se depending on the (spatial) orientation of the telescopic sight device 13. The display device 15 can be arranged in an optical channel (not shown) of the telescopic sight device 13 extending between an eyepiece and an objective end. The display device 15 can be, for example, an electronic display, in particular, an OLED display.

The telescopic sight device 13 is also formed having a communication device 17. The communication device 17 is configured for radio-based, possibly encrypted, transmission of information to and/or from a further communication partner 2, 4 of the communication system 1. Specifically, the communication device 17 can be an optionally modular, transmitting and/or receiving device. The communication device 17 is configured to receive an object information item OI transmitted by the first communication partner 2.

The display device 15 is configured to display generated display contents, in addition to the display contents supplied by the telescopic sight device 13, that is, in particular the scene optically magnified by means of the telescopic sight device 13, even display contents not supplied by the telescopic sight device 13, that is, in particular independently of the display contents supplied by the telescopic sight device 13. The latter display contents are, in particular, received object information items OI. The display device 15 is thus configured to also display received object information items OI in addition to the display contents supplied by the telescopic sight device 13. It is essential that, at a given orientation of the telescopic sight device 13 and a visual field 16 of the telescopic sight device 13 defined by the given orientation of the telescopic sight device 13, objects 7A, 7B located outside of the visual field 16 are marked as displayable or displayed outside the visual field 16 of the telescopic sight device 13. Objects 7 supplied by the telescopic sight device 13 and actually located in the visual field 16 of the telescopic sight device 13 at a given orientation of the telescopic sight device 13, and additionally objects 7A, 7B located outside the visual field 16 of the telescopic sight device 13 at the given orientation of the telescopic sight device 13 can be displayed by means of the display device 15. At the given orientation of the telescopic sight device 13, objects 7A, 7B located outside the visual field 16 of the telescopic sight device 13 are displayed marked as located outside the visual field 16.

On the one hand, the display contents supplied via the telescopic sight device 13 are therefore displayed to the user of the telescopic sight device 13 via the display device 15 of the telescopic sight device 13. On the other hand, received object information items OI can be displayed to a user of the telescopic sight device 13, wherein if these include objects 7A, 7B located outside the visual field 16 of the telescopic sight device 13 at a given orientation of the telescopic sight device 13, are displayed marked as located outside the visual field 16 of the telescopic sight device 13. A user of the telescopic sight device 13 is informed via the display device 15 on the one hand about objects 7 actually located in the visual field 16 of the telescopic sight device 13 and about objects 7A, 7B located outside the visual field 16 of the telescopic sight device 13 or the scene. The information content of the display device 15 is therefore not limited to the objects 7 actually located in the visual field of the telescopic sight device 13.

As can be seen with reference to FIG. 2-4, which each have a user-side, that is, with proper use of the telescopic sight device 13, viewable display of the display device 15 of a telescopic sight device 13 according to one embodiment, an object 7A, 7B described by the object information item OI, in particular located outside the visual field 16 of the telescopic sight device 13 at a given orientation of the telescopic sight device 13, does not have to be displayed as such an object 7A, 7B, that is, with the actually given, in particular visual, features of the object 7A, 7B. An object 7A, 7B described by the object information item OI can be displayed in a different, that is, in particular, in an abstracted, representation. The same applies to objects 7 described by the object information item OI, in particular located within the visual field 16 of the telescopic sight device 13 at a given orientation of the telescopic sight device 13.

With reference to FIG. 2-4, it can be seen that an object 7A, 7B described by the object information item OI, in particular outside the visual field 16 of the telescopic sight device 13 at a given orientation of the telescopic sight device 13, can be represented by graphical and/or alphanumeric information items. A correspondingly changed or abstracted representation of objects 7A, 7B described by the object information item OI can, for example, with regard to the data volume transmitted between the communication partners 2-4, be expedient, as the transmitted data volume can be kept relatively small.

At the given orientation of the telescopic sight device 13 in FIG. 2-4, objects 7, 7A, 7B located within and outside the visual field 16 of the telescopic sight device 13 are respectively displayed marked as outside the visual field 16 of the telescopic sight device 13 by a graphical information item, in particular a symbol, here purely by way of example, a triangle. A corresponding graphical information item, that is, in particular a corresponding symbol, can accordingly be a graphical element or a combination of several, possibly different, graphical elements. At a given orientation of the telescopic sight device 13, it can also be seen that an object 7 located within the visual field 16 of the telescopic sight device 13 is displayed marked as within the visual field 16 of the telescopic sight device 13 by a graphical information item, in particular a symbol, here, purely by way of example, a point.

For the purpose of better illustration, the objects 7A, 7B in FIG. 2-4 located outside the visual field 16 of the telescopic sight device 13 are additionally shown outside the visual field 16 or outside the display device 15 or outside the telescopic sight device 13.

As can be seen with reference to FIG. 2-4, a respective symbol is expediently a direction symbol, in particular arrow-like or -shaped, which indicates a direction in which the respective object 7A, 7B is located relative to the telescopic sight device 13. The information content of the representation of respective objects 7A, 7B displayed marked as outside the visual field 16 is thus increased in a simple manner.

Alternatively or additionally, at the or a given orientation of the telescopic sight device 13, objects 7A, 7B located outside the visual field 16 of the telescopic sight device 13 may be displayed marked as outside the visual field 16 of the telescopic sight device 13 by an alphanumeric information item. A corresponding alphanumeric information item can be at least one alphanumeric element, in particular a letter or a number, or a combination of several, possibly different, alphanumeric elements. The same applies, as mentioned, for objects 7 located within the visual field 16 of the telescopic sight device 13 at the given orientation of the telescopic sight device 13.

In order to ensure a clear optical distinctness of respective objects 7, 7A, 7B located within and outside the visual field 16 of the telescopic sight device 13 at the or a given orientation of the telescopic sight device 13, objects 7 located within the visual field 16 can be displayed by a first graphical information item at the or a given orientation of the telescopic sight device 13 marked as within the visual field 16 and objects 7A, 7B located outside the visual field 16 at the or a given orientation of the telescopic sight device 13 can be displayed by a second graphical information item different from the first graphical information item marked as outside the visual field 16. As mentioned, objects 7 located within the visual field 16 in FIG. 2-4 are shown by way of example as a point and objects 7A, 7B located outside the visual field 16 by way of example as a triangle. First and second graphical information items thus differ in at least one symbol parameter, in particular describing the geometry and/or the color of a respective symbol. The same could be effected, alternatively or additionally, with purely alphanumerical information.

It can be seen from FIG. 4 that objects 7, 7A, 7B which differ in at least one object parameter relating to a property of the respective object 7, 7A, 7B can be displayed by different graphical information items and/or by different alphanumeric information items. For example, the distance of the respective objects 7, 7A, 7B to the telescopic sight device 13 can be used as a respective object parameter. Consequently, objects 7, 7A, 7B located at different distances from the telescopic sight device 13 can be represented differently, that is, in particular in different colors and/or geometries. In FIG. 4, objects 7A, 7B located at different distances from the telescopic sight device 13 are shown, for example, in different sizes.

It can be seen from FIG. 3 that objects 7, 7A, 7B located within and outside the visual field 16 at a given orientation of the telescopic sight device 13 can additionally be displayed with at least one additional alphanumeric information item. The alphanumeric additional information item can be, for example, a distance information (see specification "501 m", "200 m", "400 m") item describing a distance of the respective object relative to the telescopic sight device 13, and/or position information item describing a current or future position, in particular GPS coordinate position, of the respective object 7, 7A, 7B, and/or a relative distance information item describing a current or future relative position of the respective object 7, 7A, 7B relative to the telescopic sight device 13, and/or a subject information item describing a type and/or subject-matter of the object 7, 7A, 7B, and/or an object evaluation information item that evaluates the object 7, 7A, 7B as friendly ("friend"), hostile or neutral or unknown. A corresponding distinction can be made, for example, by detecting visually detectable features of the object 7, 7A, 7B, that is, for example, the color of the object 7, 7A, 7B. Corresponding additional information, that is, for example, position information describing current or future positions, in particular GPS coordinate positions, of a respective object 7, 7A, 7B, can be generated by a further communication partner 4 of the communication system 1 and transmitted to the target distance measuring device 6 and/or the telescopic sight device 13.

FIG. 1 shows that the communication system 1, in addition to the first and second communication partner(s) 2, 3, can additionally comprise at least one other communication partner 4. The further communication partner 4 is also formed having a communication device 18. The communication device 18 is configured for radio-based, possibly encrypted, transmission of information to the first and/or second communication partner(s) 2, 3 and/or from the first and/or second communication partner(s) 2, 3. The communication device 18 can again be an optionally modular, transmitting and/or receiving device.

The further communication partner 4 can be formed having a communication device 18, for example, as a user-side mobile end device 19, in particular as a laptop, smartphone or tablet PC. The further communication partner 4 can be configured to process the object information items OI transmitted by the first communication partner 2 in terms of hardware and/or software, that is, in particular with regard to an evaluation criterion, such as to evaluate a temporal change of the object information item OI, for example, at a time-varying position of the object 7, 7A, 7B described by the object information item OI.

The further communication partner 4 can be configured to generate corresponding additional information, that is, for example, position information describing current or future positions, in particular GPS coordinate positions, of a respective object 7, 7A, 7B and to transmit to the target distance measuring device 6 and/or the telescopic sight device 13.

The further communication partner 4 can comprise a display device 20 for displaying information and a storage device (not shown) in which geographical map information is stored. The display device 20 can, for example, be configured to display geographical map information and additionally located objects 7, 7A, 7B described by a received object information item OI and/or a line of vision described by a received visual field information item and/or a visual field 16 described by a received visual field information item.

A method for transmitting detected object information item OI between at least two communication partners 2-4 can be implemented with the exemplary embodiment of a communication system 1 shown in FIG. 1.

In conjunction with FIGS. 2 to 4, finally, it should be noted that a reticle of the telescopic sight device 13 is indicated by the dashed horizontal and vertical lines.

The invention claimed is:

1. A communication system (1) for transmitting detected object information items (OI) between at least two communication partners (2, 3), comprising:
    at least one first communication partner (2), which is formed as a target distance measuring device (6) having a communication device (12) and an object detection device (9), wherein
    the object detection device (9) is configured to detect remote objects (7, 7A, 7B) and to generate an object information item (OI) describing a respective detected remote object (7, 7A, 7B), and
    the communication device (12) is configured to transmit a generated object information item (OI) to a second communication partner (3),
    at least one second communication partner (3), which is formed as a telescopic sight device (13) having a communication device (17) that is fastenable or fastened in particular to a firearm device, and a display device (15) displaying a visual field (16) which varies depending on the orientation of the telescopic sight device (13), wherein the communication device (17) is configured to receive object information items (OI) transmitted by the first communication partner (2), and the display device (15) is configured to display received object information items (OI), wherein objects (7A, 7B) located outside the visual field (16) at a given orientation of the telescopic sight device (13) are displayable or displayed marked as outside the visual field (16).

2. The communication system according to claim 1, characterized in that objects (7A, 7B) located outside the visual field (16) at the given orientation of the telescopic sight device (13) are displayable or displayed marked as outside the visual field (16) by a graphical information item, in particular by at least one symbol, and/or
    objects (7A, 7B) located outside the visual field (13) at the given orientation of the telescopic sight device (13) are displayable or displayed marked as outside the visual field (16) by an alphanumeric information item.

3. The communication system according to claim 2, characterized in that a graphical information item, in particular a symbol, comprises at least one graphical element, in particular a point, a triangle, a square, etc., or a combination of several, as the case may be, different, graphical elements, and
    an alphanumeric information item comprises at least one alphanumeric element, in particular a letter or a number, or a combination of several, as the case may be, different, alphanumeric elements.

4. The communication system according to claim 2, characterized in that objects (7) located within the visual field (16) at the given orientation of the telescopic sight device (13) are displayable or displayed marked as within the visual field (16) by a first graphical information item, in particular a first symbol, and objects (7A, 7B) located outside the visual field (16) at the given orientation of the telescopic sight device (13) are displayable or displayed marked as outside the visual field (16) by a second graphical information item different from the first graphical information item, in particular by a second symbol different from the first symbol.

5. The communication system according to claim 4, characterized in that a first graphical information item and a second graphical information item, in particular a first and a second symbol, differ in at least one symbol parameter, in particular describing the geometry and/or the color of a respective symbol.

6. The communication system according to claim 2, characterized in that objects (7A, 7B) located outside the visual field (16) at the given orientation of the telescopic sight device (13) are displayable or displayed marked as outside the visual field (16) by a graphical information item, in particular by at least one symbol, and/or by an alphanumeric information item, and/or
wherein objects (7A, 7B) which differ in at least one object parameter relating to a property of the respective object (7A, 7B) are displayable or displayed by different graphical information items and/or alphanumeric information items.

7. The communication system according to claim 2, characterized in that objects (7A, 7B) located outside the visual field (16) at the given orientation of the telescopic sight device (13) are displayable or displayed marked as outside the visual field (16) by a graphical information item in the form of a symbol, wherein the symbol is a directional symbol, in particular arrow-like or -shaped, which indicates a direction in which the respective object (7A, 7B) is located relative to the telescopic sight device (13).

8. The communication system according to claim 1, characterized in that objects (7, 7A, 7B) located within and/or outside the visual field (16) are additionally displayable or displayed with at least one alphanumeric additional information item.

9. The communication system according to claim 8, characterized in that the alphanumeric information item or the additional alphanumeric information item is a distance information item describing a distance of the respective object (7, 7A, 7B) relative to the telescopic sight device (13),
a position information item describing a current or future position, in particular GPS position, of the respective object (7, 7A, 7B),
a relative distance information item describing a current or future relative position of the respective object (7, 7A, 7B) relative to the telescopic sight device (13),
a subject information item describing the type and/or subject of the object (7, 7A, 7B), or
an object evaluation information item evaluating the object (7, 7A, 7B) as friendly, hostile or neutral/unknown.

10. The communication system according to claim 1, characterized in that the object detection device (9) comprises a selection device (10) for the user-side selection of certain detected remote objects (7, 7A, 7B) from a number of remote objects (7, 7A, 7B) detected by means of the object detection device (9), wherein the object detection device (9) is configured to generate an object information item (OI) describing at least one user-side-selected detected remote object (7, 7A, 7B).

11. The communication system according to claim 1, characterized by at least one further communication partner (4) which is formed as a user-side mobile end device, in particular as a laptop, smartphone or tablet PC having a communication device (18), wherein the communication device (18) is configured to receive object information items (OI) transmitted by the first communication partner (2).

12. The communication system according to claim 11, characterized in that the further communication partner (4) comprises a display device (20) for displaying information and a memory device in which geographical map information is stored, wherein the display device (20) is configured to display geographical map information and additionally objects located (7, 7A, 7B) therein, described by a received object information item (OI) and/or a line of vision described by a received visual field information item and/or a visual field (16) described by a received visual field information item.

13. A method for transmitting detected object information items (OI) between at least two communication partners (2-4), characterized in that a communication system (1) according to claim 1 is used to carry out the method.

* * * * *